United States Patent
Grossmann (10) Patent No.: US 10,116,240 B2
(45) Date of Patent: Oct. 30, 2018

(54) CONTROL DEVICE AND METHOD FOR JOINTLY CONTROLLING ASYNCHRONOUS MACHINES OF A MOTOR VEHICLE

(71) Applicant: Robert Bosch GmbH, Stuttgart (DE)

(72) Inventor: Ekard Grossmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/545,363

(22) PCT Filed: Nov. 27, 2015

(86) PCT No.: PCT/EP2015/077916
§ 371 (c)(1),
(2) Date: Jul. 21, 2017

(87) PCT Pub. No.: WO2016/119948
PCT Pub. Date: Aug. 4, 2016

(65) Prior Publication Data
US 2018/0013361 A1    Jan. 11, 2018

(30) Foreign Application Priority Data
Jan. 26, 2015    (DE) .......................... 10 2015 201 256

(51) Int. Cl.
*H02P 1/26*       (2006.01)
*H02P 7/00*       (2016.01)
(Continued)

(52) U.S. Cl.
CPC ............... *H02P 5/74* (2013.01); *B60L 3/106* (2013.01); *B60L 7/14* (2013.01); *B60L 11/18* (2013.01);
(Continued)

(58) Field of Classification Search
None
See application file for complete search history.

(56) References Cited

U.S. PATENT DOCUMENTS

| 4,335,337 A | 6/1982 | Okamatsu et al. |
| 2002/0008484 A1* | 1/2002 | Menth ................. B60L 3/10 318/432 |

FOREIGN PATENT DOCUMENTS

| DE | 19809712 | 9/1998 |
| DE | 112011103765 | 9/2013 |

OTHER PUBLICATIONS

International Search Report for Application No. PCT/EP2015/077916 dated Feb. 8, 2016 (English Translation, 2 pages).

* cited by examiner

*Primary Examiner* — Bentsu Ro
*Assistant Examiner* — Zemenay Truneh
(74) *Attorney, Agent, or Firm* — Michael Best & Friedrich LLP (57) ABSTRACT

The invention relates to a method for jointly controlling asynchronous machines (2; 3) of a motor vehicle (1) having a first asynchronous machine (2) and a second asynchronous machine (3) for driving the motor vehicle (1); an inverter (4), which is designed to supply the first asynchronous machine (2) and the second asynchronous machine (3) with a common stator voltage (5) at a common stator frequency (6). The method comprises the steps of determining a specified setpoint drive torque (11) of the motor vehicle (1) for a current driving situation of the motor vehicle (1); sensing a first rotational speed (7a) of the first asynchronous machine (2) and a second rotational speed (7b) of the second asynchronous machine (3); determining a common operating strategy of the first asynchronous machine (2) and of the second asynchronous machine (3) according to the specified setpoint torque (11) while taking into account the sensed rotational speeds (7a; 7b); and controlling the stator voltage (5) and the stator frequency (6) in order to set the drive (Continued)

torques (9a; 9b) of the asynchronous machines (2; 3) according to the operating strategy.

11 Claims, 4 Drawing Sheets

(51) Int. Cl.
   *H02P 5/74* (2006.01)
   *B60L 11/18* (2006.01)
   *B60L 7/14* (2006.01)
   *B60L 3/10* (2006.01)
   *B60L 15/20* (2006.01)
   *B60W 20/40* (2016.01)
   *B60W 10/08* (2006.01)
   *B60W 10/06* (2006.01)

(52) U.S. Cl.
   CPC ......... *B60L 15/2036* (2013.01); *B60W 10/06* (2013.01); *B60W 10/08* (2013.01); *B60W 20/40* (2013.01); *B60L 3/10* (2013.01); *B60L 2220/12* (2013.01); *B60L 2220/42* (2013.01); *B60W 2550/12* (2013.01); *B60W 2550/148* (2013.01); *H02P 2207/01* (2013.01); *Y10S 903/93* (2013.01)

CONTROL DEVICE AND METHOD FOR JOINTLY CONTROLLING ASYNCHRONOUS MACHINES OF A MOTOR VEHICLE

BACKGROUND OF THE INVENTION

The invention relates to a method for jointly controlling asynchronous machines of a motor vehicle, and to a control device for controlling such a method.

Although the present invention and the underlying problem thereof are described with reference to an electric vehicle comprising two asynchronous machines (ASM), each of which drives one wheel of a shared vehicle axle, the invention can also be applied to any other motor vehicles comprising multiple asynchronous machines in different configurations at the wheels and/or the vehicle axles of the particular motor vehicle.

In many applications of electric drive technology, situations occur in which it is advantageous to install two or more electrical machines in a motor vehicle. In the field of electric or hybrid-electric vehicles, a multiplicity of different topologies for the configuration of the drive train are utilized, in which multiple asynchronous machines or the like can be arranged in different ways. For example, there are solutions for all-wheel drive electric vehicles, in which each axle is driven by an ASM which transfers a drive torque, via a differential, to the wheels of the motor vehicle located on the particular axle. Alternatively, there are configurations in which individual wheels are each driven by one associated ASM. In the case of an all-wheel drive vehicle, the differential on each axle can be dispensed with in this case, for example.

In typical applications, each electrical machine is controlled and supplied with electrical energy via a separate associated inverter. Such inverters are frequently implemented, for example, as standalone systems having an individual housing, wherein the electrical connection to the associated electrical machine is established using appropriate plug-in and/or bolted connections. The power electronics, including the inverter, requires a volume in this case that is not inconsiderable. Due to the fact that motor vehicles comprise a continuously increasing number of mechanical, hydraulic, and electrical components, it makes sense, however, to utilize the space inside the motor vehicle, which is naturally limited, in an optimal way. In order to make it possible to simultaneously minimize the energy requirement, the weight of the motor vehicle must also be kept as low as possible.

In order to more efficiently utilize the installation space in motor vehicles comprising multiple asynchronous machines, there is a need, therefore, for an improved concept for controlling the asynchronous machines.

SUMMARY OF THE INVENTION

The present invention provides, according to one aspect, a method for jointly controlling asynchronous machines of a motor vehicle having a first asynchronous machine and a second asynchronous machine for driving the motor vehicle, and an inverter which is designed for supplying the first asynchronous machine and the second asynchronous machine with a common stator voltage at a common stator frequency. The method comprises the step of determining a specified setpoint drive torque of the motor vehicle for a current driving situation of the motor vehicle. The method further comprises the step of sensing a first speed of the first asynchronous machine and a second speed of the second asynchronous machine. The method further comprises the step of establishing a permitted value range for a first drive torque of the first asynchronous machine and a permitted value range for a second drive torque of the second asynchronous machine. The method further comprises the step of determining a common operating strategy for the first asynchronous machine and for the second asynchronous machine according to the specified setpoint torque of the motor vehicle with consideration for the sensed speeds and the established value ranges of the drive torques of the asynchronous machines. The method further comprises the step of controlling the stator voltage and the stator frequency of the inverter in order to set the drive torques of the asynchronous machines according to the operating strategy.

The present invention provides, according to one further aspect, a control device for controlling a method for jointly controlling asynchronous machines of such a motor vehicle. The control device is designed for sensing a specified setpoint drive torque of the motor vehicle for a current driving situation of the motor vehicle. The control device is further designed for sensing a first speed of the first asynchronous machine and a second speed of the second asynchronous machine. The control device is further designed for establishing a permitted value range for a first drive torque of the first asynchronous machine and a permitted value range for a second drive torque of the second asynchronous machine. The control device is further designed for determining a common operating strategy for the first asynchronous machine and for the second asynchronous machine according to the specified setpoint torque of the motor vehicle with consideration for the sensed speeds and the established value ranges of the drive torques of the asynchronous machines. The control device is further designed for controlling the stator voltage and the stator frequency of the inverter in order to set the drive torques of the asynchronous machines according to the operating strategy.

One idea according to the present invention is to provide a method for controlling multiple asynchronous machines of a motor vehicle, whereby the asynchronous machines can be jointly controlled with the aid of only one single inverter. In conventional embodiments, a separate inverter is typically required for each asynchronous machine. Due to the elimination of additional inverters, the considerable advantage results in the present invention that installation space and weight can be significantly reduced as compared to these conventional solutions. The method according to the invention and the control device according to the invention for controlling the method can be applied on all types of motor vehicles that comprise at least two asynchronous machines or the like. In principle, the present invention can also be expanded, inter alia, to applications in which more than two asynchronous machines are installed.

The present invention is based on the finding that multiple asynchronous machines can be optimally controlled simultaneously by suitably selecting a common stator voltage and a common stator frequency. For this purpose, the speeds and, therefore, the slips of the asynchronous machines are continuously sensed and evaluated. If a setpoint drive torque of a vehicle is now specified, for example, by way of a driver request, the range in which the drive torques delivered by each of the asynchronous machines are permitted to lie can be specified depending on the current driving situation and the sensed speeds. Proceeding therefrom, the common stator voltage and the common stator frequency can be set in an optimal manner in order to achieve an ideal distribution of the drive torques of the asynchronous machines according to the particular driving situation. Only one single inverter is therefore required for this purpose, which provides the appropriate stator voltage at the appropriate stator frequency. In the present method, advantage is therefore taken of the fact that the drive torque delivered by an asynchronous machine at a given speed of this asynchronous machine can be set by suitably selecting the stator voltage and the stator frequency.

According to one refinement, the determination of a common operating strategy can include the determination of a common characteristic curve of the first asynchronous machine and the second asynchronous machine as a function of the stator voltage and the stator frequency of the inverter for the current driving situation of the motor vehicle. The characteristic curve of an asynchronous machine depicts the drive torque delivered by said asynchronous machine as a function of the speed and the slip. The specific shape of the characteristic curve depends, inter alia, on the stator voltage and the stator frequency in this case. An increase/decrease in the stator voltage results in an extension/compression of the characteristic curve in the direction of the drive torque axis, while an increase/decrease in the stator frequency compresses and shifts the characteristic curve in the direction of the speed axis. The drive torque delivered by the particular asynchronous machine at a given speed can be determined on the basis of the selection of the stator voltage and the stator frequency. The method according to the invention advantageously determines a common characteristic curve for both asynchronous machines with consideration for the sensed speeds and the previously established value ranges for the drive torques of the asynchronous machines. Each asynchronous machine can be assigned a coordinate pair comprising the particular speed and the particular torque, at any point in time. The method determines a common characteristic curve which extends through the coordinate points, which are defined by the coordinate pairs, in the drive torque-speed plane, and is adapted to the particular current driving situation. In this case, the specific shape of the particular characteristic curve establishes the drive torques that are delivered by the two asynchronous machines and, therefore, how the drive torques are distributed.

According to one refinement, ESP data from an ESP system (ESP: electronic stability program) can be taken into account in order to establish the permitted value range for the first drive torque of the first asynchronous machine and the permitted value range for the second drive torque of the second asynchronous machine. Additionally or alternatively, ESP data can be taken into account in order to determine the common operating strategy for the first asynchronous machine and the second asynchronous machine for the current driving situation of the motor vehicle. A typical ESP system advantageously delivers extensive information regarding the current driving situation, for example, via speed sensors, acceleration sensors, angular displacement sensors, etc. This information can be used for finding an optimal operating strategy for the ASM. For example, potential deviations of the current driving state from a setpoint state can be precisely detected and the distribution of the drive torques can be adjusted accordingly by controlling the ASM. In addition, meaningful value ranges for the drive torques can be established even before the operating strategy is determined on the basis of the ESP data.

According to one refinement, the common operating strategy for the first asynchronous machine and the second asynchronous machine can be determined for a minimal energy consumption by the motor vehicle. In this exemplary refinement, the common characteristic curve of the two asynchronous machines can be advantageously established in such a way that the operation of the asynchronous machines is controlled as energy-efficiently as possible. For example, the situation can occur in which multiple solutions for one common characteristic curve are possible, depending on the driving situation and specified speeds of the asynchronous machines. In such cases, in this refinement, the most energy-efficient solution is selected for the operation, and the two asynchronous machines are controlled accordingly. In principle, alternatively or additionally, other optimization approaches for the selection of the operating strategy are provided. For example, depending on the driving situation, an operating strategy can be preferred that offers the greatest possible safety, for example, in the case that one or more wheels lose road adherence in adverse weather conditions.

According to one refinement, the first asynchronous machine can drive at least one first wheel on a first axle of the motor vehicle. The second asynchronous machine can drive at least one second wheel on the first axle of the motor vehicle or at least one second wheel on a second axle of the motor vehicle. For example, one ASM can drive a wheel of a vehicle axle, e.g., a left wheel of a front axle, while the other ASM drives another wheel on the same axle, e.g., a right wheel of the front axle. The precise distribution of the drive torques to the wheels can be mechanically influenced in this case, in principle, by ensuring that the slip is more or less great during the loading of the ASM by means of the number of pole pairs of the ASM or by means of a gearbox. In yet another refinement, a vehicle can comprise two ASMs per axle, e.g., two ASMs with an inverter on the rear axle and two ASMs with an inverter on the front axle. Alternatively, two ASMs with inverters can also be provided on the left side of the vehicle and two ASMs with an inverter can be provided on the right side of the vehicle.

According to one refinement, the first asynchronous machine can drive all the wheels on a first axle of the motor vehicle and the second asynchronous machine can drive all the wheels on a second axle of the motor vehicle. The drive torques of the particular ASM can be transferred, for example, via a differential to the wheels of the axle in this case. In this refinement, for example, an electric vehicle can be designed to have two ASMs which are controlled via an inverter, wherein one ASM drives a front axle and the other ASM drives a rear axle.

According to one refinement, the motor vehicle can also comprise an internal combustion engine which is coupled to the first asynchronous machine, in order to drive a first axle of the motor vehicle, and which can be switched on and off by the first asynchronous machine for driving the first axle. In this case, the method can also comprise the step of switching the internal combustion engine on and off by means of the first asynchronous machine. This advantageous refinement can be utilized, for example, for a hybrid electric vehicle. The ASM installed in the drive train of the internal combustion engine can be operated, during travel, below a start-up drive torque of the internal combustion engine. Upon start-up of the internal combustion engine, the associated characteristic curve is then changed, for example, by changing the stator voltage and/or the stator frequency, in such a way that the current drive torque exceeds the start-up drive torque of the internal combustion engine, and said internal combustion engine is started. Depending on the driving situation, the internal combustion engine can therefore be advantageously engaged, in order to provide more power, for example. For example, the internal combustion engine, together with the ASM coupled thereto, can drive a rear axle of a vehicle, while the other ASM drives a front axle.

According to one refinement, the determination of a common operating strategy can account for mechanical braking torques of the wheels of the motor vehicle, which are driven by the first asynchronous machine and/or the second asynchronous machine. In this case, the method can also comprise the step of mechanically braking the wheels of the motor vehicle according to the operating strategy. The mechanical braking torques or the mechanical braking can be controlled in this case, for example, by an ESP system which is coupled to the control device. This has several advantages, since, inter alia, more degrees of freedom for finding an optimal characteristic curve are therefore created. A specified setpoint drive torque is therefore established not only by way of the individual drive torques of the ASM (which can be set via the stator voltage and the stator frequency as a function of the particular speed). In addition, the corresponding braking torque can be simultaneously varied for each ASM, in order to create more play for setting the torque distribution. For example, in certain current driving situations, it can be difficult to find an optimal characteristic curve for a specified setpoint torque with consideration for the sensed speeds and the value ranges of the drive torques of the asynchronous machines. By adapting the braking torques in a suitable manner, it can be ensured that an optimal characteristic curve can always be found.

According to one refinement, the first speed and/or the second speed can be sensed by means of ESP speed sensors of the ESP system. Alternatively or additionally, the first speed and/or the second speed can be sensed by means of speed sensors of the asynchronous machines. The speeds are therefore advantageously provided, for example, directly by the ASM. Alternatively or additionally, the speeds can be delivered by an ESP system.

BRIEF DESCRIPTION OF THE DRAWINGS

Further features and advantages of the present invention are described in the following on the basis of embodiments and with reference to the figures.

Wherein.

DETAILED DESCRIPTION

In the figures, identical reference numbers designate elements that are identical or are functionally identical.

Figure 1:
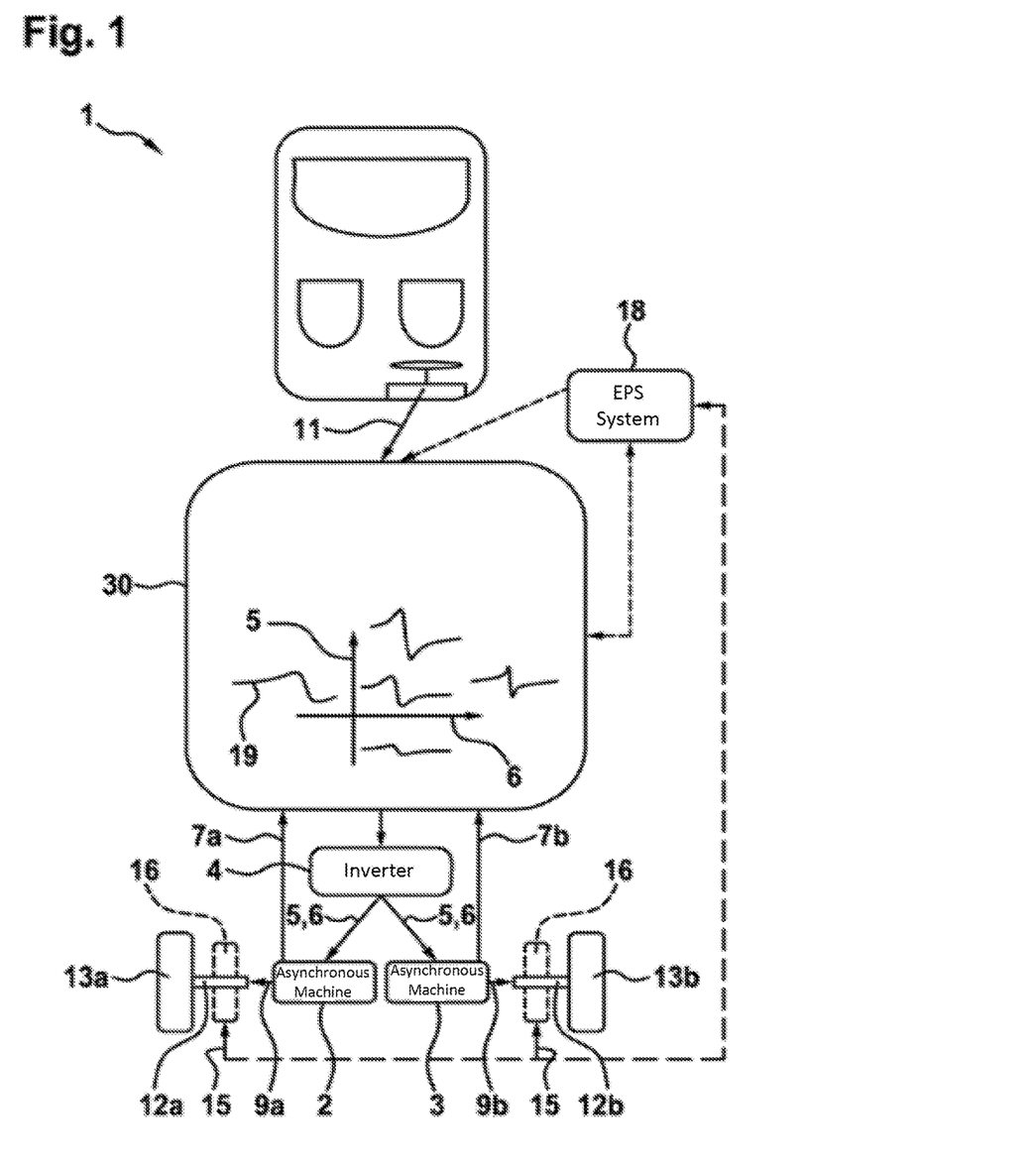
FIG. 1 shows a schematic depiction of a motor vehicle comprising two asynchronous machines and a control device for controlling a method for jointly controlling the asynchronous machines according to one embodiment of the invention.

FIG. 1 shows a schematic depiction of a motor vehicle comprising two asynchronous machines and a control device for controlling a method for jointly controlling the asynchronous machines according to one embodiment of the invention.

In FIG. 1, reference number 1 designates the motor vehicle. The motor vehicle 1 is designed having a first asynchronous machine 2 and a second asynchronous machine 3 on a first axle 12a, e.g., a front axle. The motor vehicle 1 can be, for example, a passenger car or the like, which is designed having a rear axle (not shown) having two wheels, and a front axle 12a having a first wheel 13a (right front wheel) and a second wheel 13b (left front wheel). The present invention is described in the following on the basis of this exemplary embodiment of a passenger car comprising two asynchronous machines 2; 3 on the front axle 12a.

In principle, the present invention can also be expanded to applications in which more than two asynchronous machines are installed. Moreover, the invention can also be applied on all types of motor vehicles having at least two asynchronous machines 2; 3 or the like. Other types of motor vehicles can also apply in this case, in particular, such as, for example, automobiles, motorcycles, trucks, etc., which can also have different drive topologies and axle configurations. Furthermore, these can be pure electric vehicles or hybrid electric vehicles having additional drives.

In the present case, in FIG. 1, the first asynchronous machine 2 is designed for driving the first wheel 13a of the first axle 12a of the motor vehicle 1 using a first drive torque 9a. The second asynchronous machine 3, however, is designed for driving the second wheel 13b of the first axle 12a of the motor vehicle 1 using a second drive torque 9b. For this purpose, the two asynchronous machines 2; 3 are jointly supplied with electrical energy by a single inverter 4 with a common stator voltage 5 at common stator frequency 6. The inverter 4 is designed as an inverter for converting an incoming DC voltage, which can be provided, for example, by a traction battery (not shown) installed in the motor vehicle 1, into an AC voltage (stator voltage).

The inverter 4, including the asynchronous machines 2; 3 coupled thereto, is controlled by a control device 30. In turn, the control device 30 is coupled to an ESP system 18 (or an antilock brake system, a system for traction control, or a related system) of the motor vehicle 1, which can be designed, inter alia, for specifically braking individual wheels via corresponding brakes 16 for electronic stability control. For example, the ESP system 18 can transfer braking torques 15 to the first wheel 13a and the second wheel 13b for this purpose. In principle, another control system can also be coupled to the ESP system 18 in a corresponding manner, the other control system providing the option to specifically influence the wheels 13a; 13b, for example, by transferring braking torques 15.

The control device 30 is designed, inter alia, for sensing a specified setpoint drive torque 11 of the motor vehicle 1 for a current driving situation of the motor vehicle 1. The setpoint drive torque 11 can be specified in this case, for example, by means of a driver request. Alternatively or additionally, the setpoint drive torque 11 can also be specified by the ESP system 18 or another type of control (for example, an adaptive cruise control system or the like), possibly after taking the driver request into account. The setpoint drive torque 11 determines, in particular, the desired acceleration of the motor vehicle 1.

The control device 30 is further designed for sensing a first speed 7a of the first asynchronous machine 2 and a second speed 7b of the second asynchronous machine 3. In this embodiment, the control device 30 receives the speeds 7a; 7b from speed sensors which are installed in the asynchronous machines 2; 3, respectively. Alternatively or additionally, the speeds 7a; 7b can also be provided by ESP speed sensors or other types of speed sensors provided especially therefor.

The speeds 7a; 7b of the asynchronous machines 2; 3 establish, inter alia, the slips, i.e., the speed difference between the stator rotating field and the rotor of the asynchronous machine 2; 3 relative to the rotating field speed. If the rotating field speed is designated as $n_D$, the slip at a speed n is $s=(n_D-n)/n_D$. The torque M of an asynchronous machine 2; 3 can be approximately determined from the speed n or the slip s using the so-called Kloss formula. The Kloss formula is derived from a simplified equivalent circuit of an asynchronous machine, as $$M/M_k=2/(s_k/s+s/s_k),$$

wherein $M_k$ designates the breakdown torque and $s_k$ designates the pull-out slip. The function described by the Kloss formula is also designated as the characteristic curve 19 of the asynchronous machine 2; 3. The breakdown torque or the pull-out slip are defined at the so-called breakover point which corresponds to the point on the torque-speed characteristic curve (referred to simply as the characteristic curve 19 in the following) of the asynchronous machine 2; 3 at which said machine develops its maximum torque, i.e., the breakdown torque (there is a breakover point at positive torques in the motor range of the characteristic curve 19 of an ASM, and a corresponding breakover point in the generator range at negative torques). The breakdown torque $M_k$ and the pull-out slip $s_k$ depend, in turn, on the stator voltage 5 and the stator frequency 6 (i.e., the rotating field frequency). The torque of the asynchronous machine 2; 3 can therefore be changed as a function of the speed n by varying the stator voltage 5 and the stator frequency 6.

The control device 30 is further designed for establishing a permitted value range for a first drive torque 9a of the first asynchronous machine 2 and a permitted value range for a second drive torque 9b of the second asynchronous machine 3. The instantaneous values of the drive torques 9a; 9b at any point in time, at given speeds 7a; 7b, result from the particular characteristic curve 19 for the set stator voltage 5 and the set stator frequency 6. Assigned to each of the two asynchronous machines 2; 3, therefore, is a torque value range $M_{max}>M=M(U, f, n)>M_{min}$, wherein the torque or drive torque 9a; 9b is a function of the stator voltage 5, the stator frequency 6, and the speed 7a; 7b. The particular value range of the drive torques 9a; 9b results from ESP data from the ESP system 18, for example, depending on the current driving situation.

The control device 30 is further designed for determining a common operating strategy for the first asynchronous machine 2 and for the second asynchronous machine 3 according to the specified setpoint torque 11 of the motor vehicle 1 with consideration for the sensed speeds 7a; 7b and the established value ranges of the drive torques 9a; 9b of the asynchronous machines 2; 3.

Figure 2A:
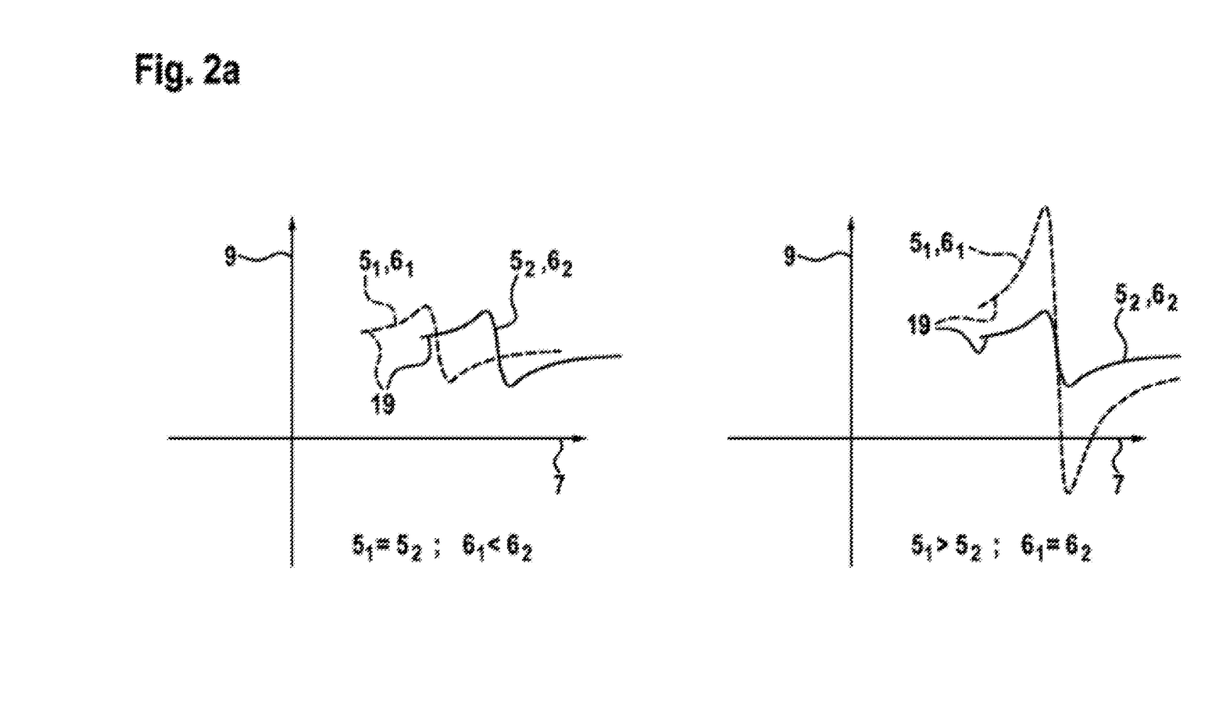
FIG. 2a shows schematic characteristic curves of an asynchronous machine of the type used in the motor vehicle in FIG. 1.

As described further above, the specific shape of the characteristic curve 19 depends, inter alia, on the stator voltage 5 and the stator frequency 6. An increase/decrease in the stator voltage 5 results in an extension/compression of the characteristic curve 19 in the direction of the drive torque axis, while an increase/decrease in the stator frequency 6 compresses and shifts the characteristic curve 19 in the direction of the speed axis. This is shown in FIG. 2a by way of example. FIG. 2a shows, for this purpose, schematic characteristic curves 19 of an asynchronous machine 2; 3, of the type used in the motor vehicle 1 in FIG. 1, for different values of the stator voltage 5 and the stator frequency 6. The characteristic curves 19 are depicted as a function of the drive torque 9 with respect to speed 7. In the left depiction in FIG. 2a, the stator frequency 6 is varied, while the stator voltage 5 is varied in the right depiction.

The drive torque 9a; 9b delivered by the asynchronous machine 2; 3, respectively, at a given speed 7a; 7b can be determined on the basis of the selection of the stator voltage 5 and the stator frequency 6. By varying the stator voltage 5 and the stator frequency 6, the control device 30 determines a common characteristic curve 19 for both asynchronous machines 2; 3 with consideration for the sensed speeds 7a; 7b and the previously established value ranges of the drive torques 9a; 9b of the asynchronous machines 2; 3. Each asynchronous machine 2; 3 can be assigned a coordinate pair comprising the speed 7a; 7b, respectively, and the torque 9a; 9b, respectively, at any point in time. The control device 30 determines a common characteristic curve 19 which extends through the coordinate points, which are defined by the coordinate pairs in the drive torque-speed plane, and is adapted to the particular current driving situation. In this case, the specific shape of the particular characteristic curve 19 establishes which drive torques 9a; 9b are delivered by the two asynchronous machines 2; 3 and, therefore, how the drive torques 9a; 9b are distributed onto the two wheels 13a; 13b.

In the determination of the operating strategy or the corresponding control of the asynchronous machines 2; 3, it can be permissible to use not only the usually used operating points between the breakover points of a characteristic curve 19, but also operating points to the left and the right of the breakover points (in the unstable operating range of the ASM). One example thereof is shown in FIG. 2c and is described further below.

In the exemplary embodiment of the control device 30 according to the invention in FIG. 1, the determination of the common operating strategy for the first asynchronous machine 2 and the second asynchronous machine 3 includes, in particular, a determination of a characteristic curve 19 having a minimal energy consumption by the motor vehicle 1. In particular, the instantaneous energy consumption can be set to be minimal in this case.

The control device 30 is further designed for controlling the stator voltage 5 and the stator frequency 6 of the inverter 4 in order to set the drive torques 9a; 9b of the asynchronous machines 2; 3 according to the operating strategy. The individual method steps of the above-described method 20 of the control device 30 can be carried out continuously during the operation of the motor vehicle 1, in order to continuously control the asynchronous machines 2; 3.

Depending on the current driving situation, it can prove to be difficult to determine a solution for a common optimal characteristic curve 19. In such cases, it is provided in the present embodiment that the determination of the common operating strategy also accounts for mechanical braking torques 15 of the wheels 13a; 13b driven by the first asynchronous machine 2 and/or the second asynchronous machine 3. Proceeding therefrom, the additional braking torques of the individual wheels 13a; 13b can be used for effectively expanding the play for possible drive torques 9a; 9b. As a result, it is ensured that an optimal solution for a common characteristic curve 19 or a distribution of drive torque to the wheels 13a; 13b can be found in every case.

Figure 2B:
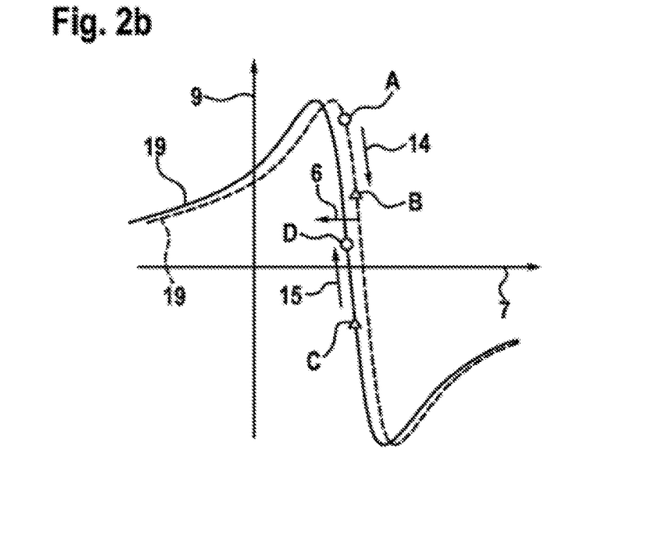
FIG. 2b shows a schematic depiction of one exemplary application of the method of the control device in FIG. 1.
Figure 2C:
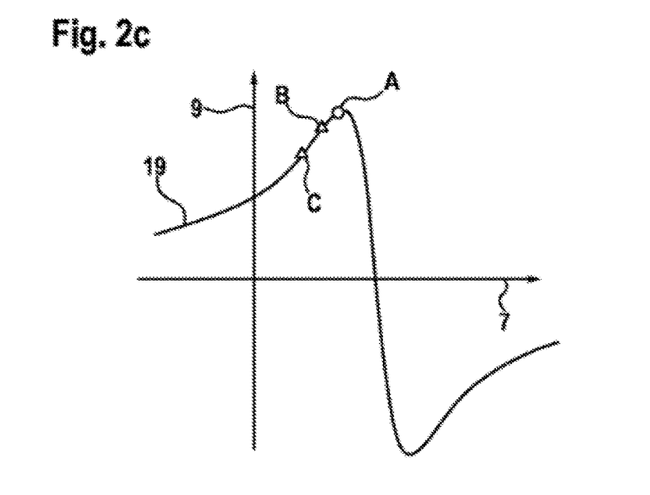
FIG. 2c shows a schematic depiction of yet another exemplary application of the method of the control device in FIG. 1.

FIG. 2b shows a schematic depiction of one exemplary application of the method 20 of the control device 30 from FIG. 1.

A driving situation will be described here, by way of example, with reference to the two characteristic curves 19 depicted in FIG. 2b. The motor vehicle 1 is located on a straight path, for example, and is therefore driving straight ahead. At the beginning, both wheels 13a; 13b have the same speed 7a; 7b and the same torque 9a; 9b. The two wheels 13a; 13b are therefore located at a common point A on the characteristic curve. The first wheel 13a now comes upon a patch of ice or gravel or the like and "spins". This causes the speed 7a of the first wheel 13a to increase and the drive torque 9a to drop accordingly. While the second wheel 13b is still located at point A, the first wheel 13a travels to point B on the characteristic curve 19 (indicated by an arrow having the reference number 14). In order to bring the first wheel 13a back under control, after sensing the changed speed 7a of the first wheel 13a, the control device 30 reduces the stator frequency 6 (indicated by an arrow having the reference number 6). As a result, the characteristic curve 19 is shifted in the negative axis direction of the speed axis 7. As a consequence thereof, the drive torque 9a of the first wheel 13a decreases further at the same speed 7a until said torque is at point C. The second wheel 13b is now located at point D again, having the same speed 7b and likewise having a correspondingly reduced drive torque 9b. As can be read from the characteristic curve 19 in FIG. 2b, the first wheel 13a therefore now has a negative, i.e., braking, drive torque 9a, while the drive torque 9b of the second wheel 13b is close to zero. Due to the braking effect, the first wheel 13a travels on the characteristic curve to point D (indicated by an arrow having the reference number 15) until both wheels are located at the same point again. The first wheel 13a is therefore successfully brought under control.

Correspondingly, the control device 30 according to this embodiment can also engage, in a controlling manner, in other typical driving situations, for example, during cornering, with operation of the asynchronous machines 2; 3 in the braking mode or, alternatively, in the generator mode.

In one further embodiment of the solution according to the invention, the motor vehicle 1 can also comprise an internal combustion engine (not depicted here). Said internal combustion engine can be coupled to an asynchronous machine in order to drive an axle of the motor vehicle 1. In one alternative embodiment of a hybrid electric vehicle, the internal combustion engine, together with a first asynchronous machine 2, can drive a rear axle, for example, while a front axle is driven by a second asynchronous machine 3. In this case, both asynchronous machines 2; 3 are therefore controlled by one inverter 4. In addition, the internal combustion engine can be switched on and off by the first asynchronous machine 2 for driving the rear axle. In this embodiment, a corresponding control device 30 would use this in order to control the drive torque 9a of the first asynchronous machine 2 in such a way that the internal combustion engine can be switched on or off as necessary. For example, the second asynchronous machine 3 can drive the front axle at a fixedly specified speed 7b and a fixedly specified drive torque 9b, while the speed 7a and drive torque 9a of the internal combustion engine, including the first asynchronous machine 2, are freely variable.

FIG. 2c shows a schematic depiction of one further exemplary application of the method 20 of the control device 30 in FIG. 1.

The characteristic curve 19 depicted in FIG. 2c corresponds to an exemplary driving situation during cornering of the motor vehicle 1, in which the right wheel 13a is the wheel on the outside of the curve, and the left wheel 13b is the wheel on the inside of the curve. In this example, the operating point of the first asynchronous machine 2 is set close to the breakover point (point A) by means of the stator voltage 5 and the stator frequency 6, while the operating point of the second asynchronous machine 3 is located to the left of the breakover point (point B and point C, which are in the unstable operating range of the asynchronous machine). In this case, point B corresponds to an operating point for a curve having a large radius, and point C is an operating point for a curve having a smaller radius, at which the speed 7b and the drive torque 9b of the wheel 13b on the inside of the curve decrease further (any differences in the stator voltage 5 and the stator frequency 6 for these two curves are not taken into account here, for the sake of simplicity). The control device 30 in this exemplary embodiment is therefore also capable of accounting for operating points in an unstable range of the asynchronous machines 2; 3. This may make it necessary to carry out a more rapid readjustment in shorter intervals.

Figure 3:
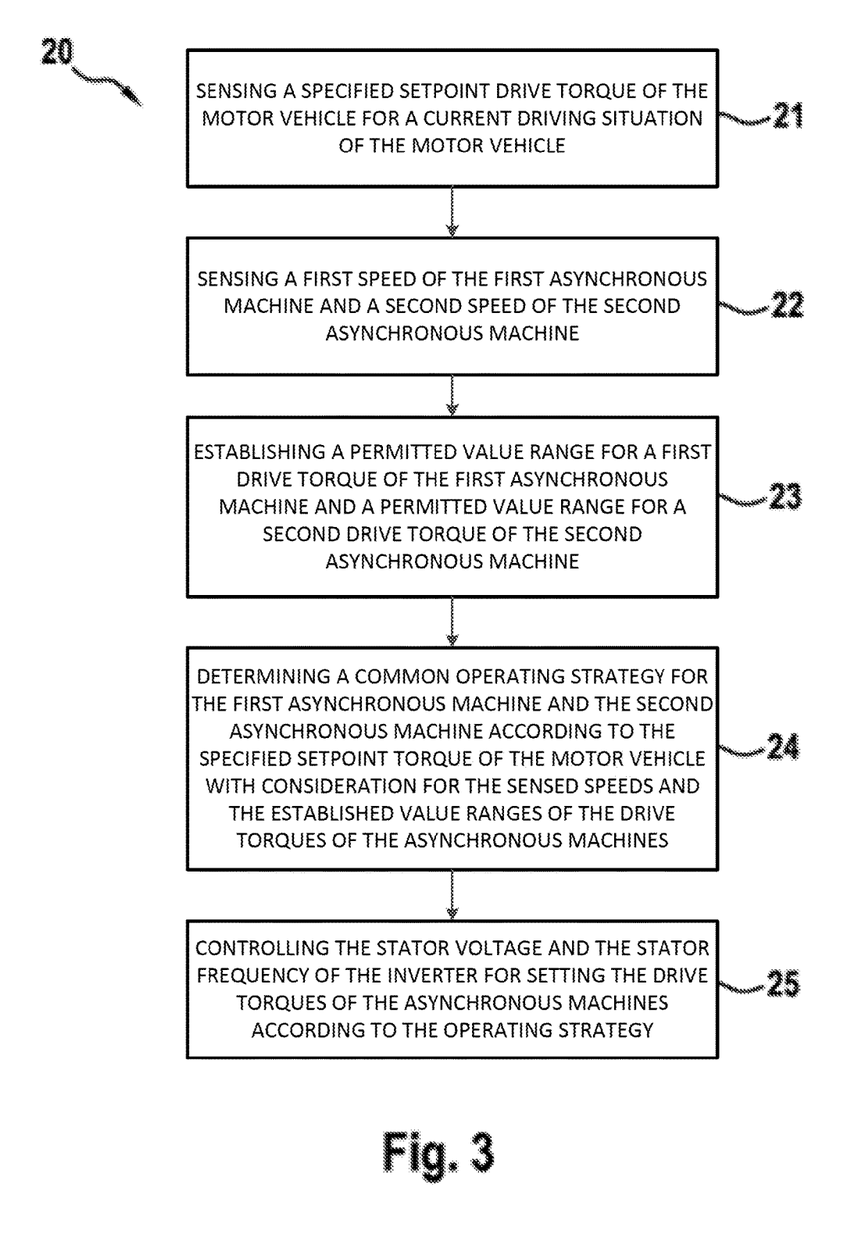
FIG. 3 shows a schematic depiction of the method steps of the method of the control device in FIG. 1.

FIG. 3 shows a schematic depiction of the method steps of the method 20 of the control device 30 from FIG. 1.

The method 20 comprises, under 21, the step of sensing a specified setpoint drive torque 11 of the motor vehicle 1 for a current driving situation of the motor vehicle 1. Under 22, the method 20 comprises, in a subsequent step, sensing a first speed 7a of the first asynchronous machine 2 and a second speed 7b of the second asynchronous machine 3. In addition, the method 20 comprises, under 23, the step of establishing 23 a permitted value range for a first drive torque 9a of the first asynchronous machine 2 and a permitted value range for a second drive torque 9b of the second asynchronous machine 3. The method 20 further comprises, under 24, the step of determining a common operating strategy for the first asynchronous machine 2 and the second asynchronous machine 3 according to the specified setpoint torque 11 of the motor vehicle 1 with consideration for the sensed speeds 7a; 7b and the established value ranges of the drive torques 9a; 9b of the asynchronous machines 2; 3. The method 20 further comprises, under 25, the step of controlling the stator voltage 5 and the stator frequency 6 of the inverter 4 for setting the drive torques 9a; 9b of the asynchronous machines 2; 3 according to the operating strategy.

In principle, the individual steps of the method 20 can be continuously carried out, over and over, during the operation of the motor vehicle 1. In this way, for example, an energy-optimized operating strategy is also continuously updated, for example, because driving situation-dependent changes or deviations make it necessary to correct the strategy.

The invention claimed is:

1. A method (20) for jointly controlling asynchronous machines (2; 3) of a motor vehicle (1) comprising a first asynchronous machine (2) and a second asynchronous machine (3) for driving the motor vehicle (1); and an inverter (4) which is designed for supplying the first asynchronous machine (2) and the second asynchronous machine (3) with a common stator voltage (5) at a common stator frequency (6);

wherein the method comprises the steps of:

sensing (21) a specified setpoint drive torque (11) of the motor vehicle (1) for a current driving situation of the motor vehicle (1); sensing (22) a first speed (7a) of the first asynchronous machine (2) and a second speed (7b) of the second asynchronous machine (3);

establishing (23) a permitted value range for a first drive torque (9a) of the first asynchronous machine (2) and a permitted value range for a second drive torque (9b) of the second asynchronous machine (3);

determining (24) a common operating strategy for the first asynchronous machine (2) and the second asynchronous machine (3) according to the specified setpoint torque (11) of the motor vehicle (1) with consideration for the sensed speeds (7a; 7b) and the established value ranges of the drive torques (9a; 9b) of the asynchronous machines (2; 3); and controlling (25) the stator voltage (5) and the stator frequency (6) of the inverter (4) for setting the drive torques (9a; 9b) of the asynchronous machines (2; 3) according to the operating strategy.

2. The method (20) as claimed in claim 1,
wherein the determination (24) of a common operating strategy includes the determination of a common characteristic curve (19) of the first asynchronous machine (2) and the second asynchronous machine (3) as a function of the stator voltage (5) and the stator frequency (6) of the inverter (4) for the current driving situation of the motor vehicle (1).

3. The method (20) as claimed in claim 1,
wherein the motor vehicle (1) also comprises an ESP system (18); and wherein ESP data from the ESP system (18) are taken into consideration in order to
establish the permitted value range for the first drive torque (9a) of the first asynchronous machine (2) and the permitted value range for the second drive torque (9b) of the second asynchronous machine (3);
determine the common operating strategy for the first asynchronous machine (2) and the second asynchronous machine (3) for the current driving situation of the motor vehicle (1); or
both.

4. The method (20) as claimed in claim 1,
wherein the common operating strategy for the first asynchronous machine (2) and the second asynchronous machine (3) is determined for a minimal energy consumption by the motor vehicle (1).

5. The method (20) as claimed in claim 1,
wherein the first asynchronous machine (2) drives at least one first wheel (13a) on a first axle (12a) of the motor vehicle (1); and wherein the second asynchronous machine (3) drives at least one second wheel (13b) on the first axle (12a) of the motor vehicle (1) or at least one second wheel (13b) on a second axle (12b) of the motor vehicle (1).

6. The method (20) as claimed in claim 1,
wherein the first asynchronous machine (2) drives all the wheels (13a; 13b) on a first axle (12a) of the motor vehicle (1), and the second asynchronous machine (3) drives all the wheels (13a; 13b) on a second axle (12b) of the motor vehicle (1).

7. The method (20) as claimed in claim 1,
wherein the motor vehicle (1) also comprises an internal combustion engine which is coupled to the first asynchronous machine (2), in order to drive a first axle (12) of the motor vehicle (1), and which can be switched on and off by the first asynchronous machine (2) for driving the first axle (12); and
wherein the method also comprises the step of switching the internal combustion engine on and off (26) by means of the first asynchronous machine (2).

8. The method (20) as claimed in claim 1,
wherein the determination (24) of a common operating strategy accounts for mechanical braking torques (15) of the wheels (13a; 13b) of the motor vehicle (1) driven by the first asynchronous machine (2), the second asynchronous machine (3) or both; and
wherein the method also comprises the step of mechanically braking (27) the wheels (13a; 13b) of the motor vehicle (1) according to the operating strategy.

9. The method (20) as claimed in claim 1,
wherein the first speed (7a), the second speed (7b) or both are sensed by means of ESP speed sensors of an ESP system (18), by means of speed sensors of the asynchronous machines (2; 3), or both.

10. A control device (30) for controlling a method (20) for jointly controlling asynchronous machines (2; 3) of a motor vehicle (1) comprising
a first asynchronous machine (2) and a second asynchronous machine (3) for driving the motor vehicle (1); and
an inverter (4) which is designed for supplying the first asynchronous machine (2) and the second asynchronous machine (3) with a common stator voltage (5) at a common stator frequency (6);
wherein the control device (30) is designed for:
sensing a specified setpoint drive torque (11) of the motor vehicle (1) for a current driving situation of the motor vehicle (1);
sensing a first speed (7a) of the first asynchronous machine (2) and a second speed (7b) of the second asynchronous machine (3);
establishing a permitted value range for a first drive torque (9a) of the first asynchronous machine (2) and a permitted value range for a second drive torque (9b) of the second asynchronous machine (3);
determining a common operating strategy for the first asynchronous machine (2) and the second asynchronous machine (3) according to the specified setpoint torque (11) of the motor vehicle (1) with consideration for the sensed speeds (7a; 7b) and the established value ranges of the drive torques (9a; 9b) of the asynchronous machines (2; 3); and controlling the stator voltage (5) and the stator frequency (6) of the inverter (4) for setting the drive torques (9a; 9b) of the asynchronous machines (2; 3) according to the operating strategy.

11. A motor vehicle (1) comprising a control device (30) as claimed in claim 10.

* * * * *